US 6,560,220 B2

(12) United States Patent
Melen (10) Patent No.: US 6,560,220 B2
(45) Date of Patent: May 6, 2003

(54) NETWORK ACCESS DEVICE AND TELECOMMUNICATIONS SIGNALING (75) Inventor: Björn Melen, Espoo (FI)

(73) Assignee: Telefonaktiebolaget L M Ericsson (Publ) (SE)

(*) Notice: Subject to any disclaimer, the term of this patent is extended or adjusted under 35 U.S.C. 154(b) by 0 days.

(21) Appl. No.: 09/096,655

(22) Filed: Jun. 12, 1998

(65) Prior Publication Data
US 2002/0057673 A1 May 16, 2002

Related U.S. Application Data
(60) Provisional application No. 60/050,325, filed on Jun. 20, 1997.

(51) Int. Cl.⁷ .................... H04L 12/66; H04L 12/50
(52) U.S. Cl. .................... 370/352; 370/353; 379/114
(58) Field of Search ................... 370/352, 353, 370/354, 355, 356, 389, 401, 410, 426, 465, 493, 494, 495, 358; 709/227; 455/406; 379/114, 22, 900, 265.09

(56) References Cited

U.S. PATENT DOCUMENTS

| | | | |
|---|---|---|---|
| 5,418,842 A | 5/1995 | Cooper | 379/98 |
| 5,577,105 A | 11/1996 | Baum et al. | 379/93 |
| 5,598,536 A | 1/1997 | Slaughter, III et al. | 395/200.16 |
| 5,845,267 A | * 12/1998 | Ronen | 705/40 |
| 5,956,391 A | * 9/1999 | Melen et al. | 379/114 |
| 6,073,176 A | * 6/2000 | Baindur et al. | 709/227 |
| 6,154,523 A | * 11/2000 | Hofmann et al. | 379/22 |
| 6,292,478 B1 | * 9/2001 | Farris | 370/352 |
| 6,298,043 B1 | * 10/2001 | Mauger et al. | 370/248 |

FOREIGN PATENT DOCUMENTS

| | | |
|---|---|---|
| EP | 0 762 707 A2 | 3/1997 |
| EP | 101377 | 1/1999 |
| WO | WO 97/01920 | 1/1997 |
| WO | WO 97/38551 | 10/1997 |
| WO | WO 97/50230 | 12/1997 |
| WO | 98/00541 | 10/1998 |

* cited by examiner

Primary Examiner—Wellington Chin
Assistant Examiner—Brenda Pham
(74) Attorney, Agent, or Firm—Jenkens & Gilchrist, A Professional Corporation (57) ABSTRACT A method and apparatus enables a Network Access Server (NAS) in conjunction with a telecommunications switch to combine computer protocols with telecommunications signaling. For instance, a Point-to-Point Protocol (PPP) is combined with B-Answer and B-on-Hook signals. When a subscriber dials into an NAS to access a private network (e.g., the Internet), the various phases of a PPP are addressed. The network phase provides communication throughput from the subscriber to the Internet. According to a first aspect of the present invention, a B-Answer signal is sent to the telecommunications network after the network phase is entered. According to a second aspect of the present invention, a B-on-Hook signal is sent to the telecommunications network approximately as the "Closing" transition of the PPP occurs. Telecommunications network billing therefore occurs as a result of, and in direct proportion to, Internet communication provided to the subscriber.

20 Claims, 4 Drawing Sheets

NETWORK ACCESS DEVICE AND TELECOMMUNICATIONS SIGNALING

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/050,325, filed Jun. 20, 1997.

BACKGROUND OF THE INVENTION

1. Technical Field of the Invention

The present invention relates in general to the telecommunications field, and in particular, to a method and system for implementing a Network Access Server (NAS) in association with a telecommunications switch.

2. Description of Related Art

Access to the Internet is increasingly desirable to achieve economic, educational, and communicative purposes. Individuals typically access the Internet from a personal electronic device such as a computer, personal digital assistant, or cellular phone. Subscribers in a public telephone network establish data connections to the Internet over an NAS. The data connections to an NAS are established over Plain Old Telephone Service (POTS) phone lines or Integrated Services Digital Network (ISDN) lines. At the subscriber end, normal POTS modems or ISDN network terminals (NT-Is, or network terminals on an ISDN connection) are used to initiate the communications. Personal computers with suitable communications software and hardware are frequently used as the terminal in conjunction with either a modem or NT-I.

The NAS acts as a router and concentrator for Internet Protocol (IP) packets that arrive via the data connections. The link level of the incoming data connections can also be terminated at the NAS. For analog lines, such as those originating with a POTS modem, modem pools may be provided at the NAS. IP packets are forwarded to an Internet gateway through various possible channels from the NAS. The IP packets are then transported over the Internet to the appropriate Internet destination.

In summary, an NAS accepts modem or ISDN calls to an Internet service provider (ISP), terminates the phone connection, and interprets the link layer protocol, e.g., Point to Point Protocol (PPP). The IP data packets are then forwarded to the Internet or possibly an intranet.

An NAS typically has an internal network for receiving and routing packets to the Internet. The internal network includes both electronic devices and one or more edge routers (e.g., an Internet Point-of-Presence, or INET-POP). The electronic devices are important for terminating the phone line connection and reformatting a subscriber's data to comport with the Internet protocol. In a conventional NAS, however, the processing of incoming calls from subscribers is independent of the telecommunication signaling of the associated telecommunications switch.

Typically, the NAS will transmit a B-Answer to the telecommunications network as soon as the incoming call is connected to the NAS. The calling subscriber, however, ultimately desires a connection to the Internet, not the intermediate NAS. Unfortunately, the transmission of the B-Answer begins the billing procedure even before the NAS has begun to establish a link to the Internet. Moreover, the attempt to establish a link (e.g., through PPP) may fail. As a result, the subscriber may be billed for a connection to the Internet that is never provided.

In summary, conventional NASs in conjunction with associated telecommunication switches do not (i) combine telecommunication signaling with the link establishment procedure of the NAS, or (ii) ensure that a subscriber will receive Internet communication service prior to billing the subscriber for using the telecommunications network.

SUMMARY OF THE INVENTION

The present invention provides a method and apparatus for an NAS in association with a telecommunications switch whereby computer protocols are combined with telecommunications signaling. Consequently, a subscriber is only billed for telecommunications network use that occurs as a result of, and in direct proportion to, private network communication throughput provided to the subscriber.

Incoming calls to the telecommunications switch that are intended to access a private network such as the Internet are routed to the NAS. In a preferred embodiment, the NAS includes a group of processing devices that provide formatting changes for information being transmitted from the public telephone network to a private network such as the Internet, and vice versa. The processing devices are interconnected via an Ethernet network and include a router that is a gateway to the Internet.

A mutually-understood computer protocol determines the framing and other parameters under which information is transmitted across a communication link from a subscriber's point to the point of the NAS. In a preferred embodiment, a PPP governs these link options. The PPP includes five phases, which are the dead, establish, authenticate, network, and terminate phases. Information throughput from the subscriber to the Internet is possible in the network phase.

According to a first aspect of the present invention, a B-Answer communication is sent from the NAS to the telecommunications switch (and then onward to the telecommunications network as a B-Answer signal) after the network phase is entered. In a specific implementation of this first aspect, a negotiation of network parameters, IP addresses, etc. occurs during the network phase. Once this negotiation is complete, an open state (e.g., in a PPP) is attained and the B-Answer communication may be issued. According to a second aspect of the present invention, a B-on-Hook signal is sent from the NAS to the telecommunications switch (and then onward to the telecommunications network as a B-on-Hook signal) after the network phase begins to conclude but before the communication link is completely terminated. The calling subscriber is therefore only billed while information throughput to the Internet is possible.

An important technical advantage of the present invention is that subscribers will not be billed for service that they do not receive.

Another important technical advantage of the present invention is that subscribers will not be billed for telecommunications network use unless/until an Internet connection can be set-up (and preferably authenticated) for a calling subscriber.

Yet another important technical advantage of the present invention is that an NAS can delay the transmission of a B-Answer signal until a network-layer phase of the PPP is set-up.

Yet another important technical advantage of the present invention is that an NAS can transmit a B-on-Hook signal before entering a dead phase of the PPP.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–5B of the drawings, like numerals being used for like and corresponding parts of the various drawings.

Figure 1:
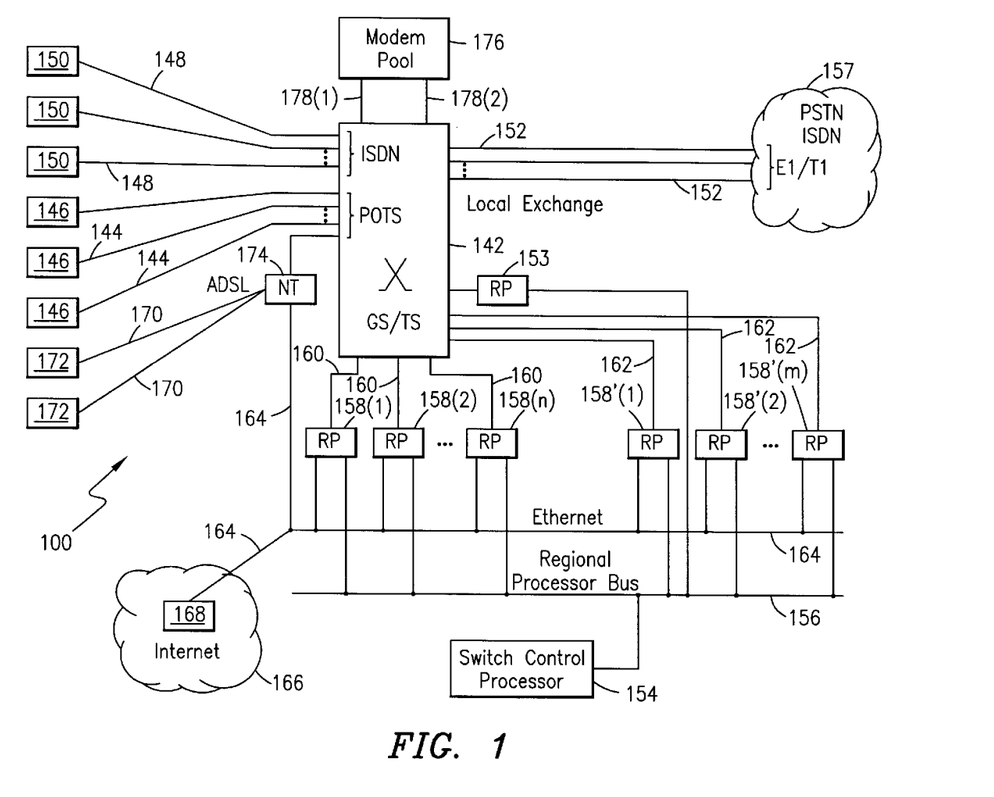
FIG. 1 illustrates a detailed diagram of a local exchange (LE) with an NAS which can be used to implement the present invention.

FIG. 1 illustrates a detailed diagram of a LE with an NAS which can be used to implement the present invention. The block diagram of a LE 100 includes an integrated NAS function. The LE 100 comprises a standard Ericsson AXE-type switch including a group switch/time switch (GS/TS) 142 which is connected to users 146 via a plurality of Plain Old Telephone Service (POTS) connection lines 144, as well as to users 150 via a plurality of ISDN 2B+D connection lines 148. The GS/TS 142 is further connected to a plurality of E1/T1 trunk connections 152 through which a communications interconnection is made to other LEs as well as to transit exchanges (TEs) over the Public Switched Telephone Network and/or ISDN (PSTN/ISDN) 157.

The GS/TS 142 of the LE 100 has a configuration and operation well known in the art for selectively interconnecting certain selected ones of the POTS connection lines 144 and/or ISDN connection lines 148 to certain selected ones of the E1/T1 trunk connections 152. Control over the operation of the GS/TS 142 in making the foregoing selected interconnections is effectuated by a regional processor (RP) 153 under the command of a central switch control processor (SCP) 154. A regional processor control bus 156 carries the signaling between the SCP 154 and the RP 153 necessary to control GS/TS 142 operation.

The LE 100 further includes a plurality of additional RPs used in providing the integrated access server functionality. A first plurality of the RPs 158(1), 158(2) . . . , 158(n) are connected via DL2 interface connections 160 to the GS/TS 142, and are connected to the SCP 154 via the regional processor control bus 156. Responsive to instructions issued by the SCP 154, data communications may be selectively connected (i.e., routed) between any one of the POTS connection lines 144 and/or ISDN connection lines 148 and the first plurality of the RPs 158(1), 158(2), . . . , 158(n).

A second plurality of the RPs 158'(1), 158'(2), . . . , 158'(m) are connected via DL2 interface connections 162 to the GS/TS 142, and are connected to the SCP 154 via the regional processor control bus 156. Similarly, responsive to instructions issued by the SCP 154, data communications may be selectively connected (i.e., routed) between any one of the E1/T1 trunk connections 152 and the second plurality of the RPs 158'(1), 158'(2), . . . , 158'(m).

The first plurality of the RPs 158(1), 158(2), . . . , 158(n) and the second plurality of the RPs 158'(1), 158'(2), . . . , 158'(m) are interconnected by an Ethernet link 164. Responsive to instructions issued by the SCP 154 and transmitted over the regional processor control bus 156, data communications may be selectively inserted into and extracted from the Ethernet link 164 by any of the first and second plurality of RPs 158 and 158'.

Using the Ethernet link 164, a direct connection is made from the LE 100 to the Internet 166 (perhaps through an Internet access point edge router 168). The Ethernet link 164 is further used to make a connection between the LE 100 and a plurality of asymmetric data subscriber line (ADSL) connection lines 170 to users 172. A network terminal (NT-A) 174, providing an ADSL termination, interfaces the plurality of ADSL connection lines 170 to the Ethernet link 164. The NT-A 174 also interfaces the lines 170 to the GS/TS 142 via one or more of the POTS connection lines 144. As the ADSL connection lines 170 carry both voice and data (sometimes simultaneously), the NT-A 174 functions to reroute the voice components of a call over the POTS connection lines 144 to the GS/TS 142, and reroute the data components of that call over the Ethernet link 164.

The first plurality of RPs 158(1), 158(2), . . . , 158(n) function to convert (e.g., format or frame) the actual user data communications between the data communications protocol required for transmission over the POTS connection lines 144 and/or ISDN connection lines 148 and the data communications protocol required for transmission over the Ethernet link 164. Conversely, the second plurality of the RPs 158'(1), 158'(2), . . . , 158'(m) function to convert (e.g., format or frame) the actual user data communications between the data communications protocol required for transmission over the Ethernet link 164 and the data communications protocol required for transmission over E1/T1 trunk connections 152.

The Ethernet link 164 functions to concentrate the packets of the data communications received from the POTS connection lines 144, ISDN connection lines 148, and/or ADSL connection lines 170 for GS/TS 142 routing and transmission over the E1/T1 trunk connections 152. Similarly, the Ethernet link 164 functions to concentrate the packets of the data communications received from the E1/T1 trunk connections 152 for GS/TS 142 routing and transmission over the POTS connection lines 144, ISDN connection lines 148, and/or ADSL connection lines 170. It should be understood that while only one Ethernet link 164 is described in this exemplary embodiment, a plurality of Ethernet links 164 may be implemented in conjunction with the present invention. For example, each of the clusters illustrated in FIG. 2 and described below may be on a separate Ethernet link 164.

The LE 100 still further includes a modem pool 176 implemented on a digital signal processing (DSP) platform and connected via DL2 interface connections 178(1) and 178(2) to the GS/TS 142. In particular, the modem pool 176 may be selectively connected by the GS/TS 142 (at the instruction of the SCP 154) through DL2 interface connection 178(1) to any one of the POTS connection lines 144. The modem pool 176 processes (e.g., modulates and de-modulates) data communications being transmitted to or received from users 146 over the POTS connection lines 144. The DL2 interface connection 178(2) and the DL2 interface connections 160 further enable the modem pool 176 to be selectively connected (in response to SCP 154 instruction) through the GS/TS 142 to the first plurality of RPs 158(1), 158(2), . . . , 158(n). This provides a route for data packet transmission between the POTS connection lines 144 and the Ethernet link 164.

The operation of the LE 100, which includes an integrated NAS functionality for supporting more efficient data communications, will now be described. In one mode of operation, the LE 100 supports efficient and direct user/subscriber data communications over a private data communications network such as the Internet 166 or possibly an intranet (not shown). In another mode of operation, the LE 100 supports efficient and direct user/subscriber data communications over a public data communications network such as the PSTN and/or ISDN 157 (concurrent with conventional voice communications). It should, of course, be understood that the LE 100 can simultaneously support such user/subscriber data communications over both the private and public networks in both modes of operation if necessary.

With respect to the former mode of operation relating to user/subscriber data communications over a private data communications network such as the Internet 166, consider first a data communication between a user 146 connected to one of the plurality of POTS connection lines 144 and the Internet 166. The data communication carried from the user 146 over the POTS connection line 144 comprises an analog data communication which is routed from the GS/TS 142 over the DL2 interface connection 178(1) to the modem pool 176, where it is de-modulated and output over the DL2 interface connection 178(2). The data communication is then routed back through the GS/TS 142 and over the DL2 interface connections 160 to the first plurality of RPs 158(1), 158(2), . . . , 158(n).

In the first plurality of RPs 158, the protocol of the data communication is converted (e.g., de-framed) from the protocol required for transmission over the POTS connection line 144 (e.g., PPP or Serial Line Internet Protocol (SLIP)) to the protocol required for transmission over the Ethernet link 164 (e.g., Transmission Control Protocol/Internet Protocol (TCP/IP)). The protocol converted data communication is then output to the Ethernet link 164.

The Ethernet link 164 functions to concentrate the data communication with other data communications (from other users 146, as well as users 150 and 172) received from the first plurality of RPs 158 and the NT-A 174. The data communication is then sent over the Internet 166 through the Internet access point edge router 168. The first plurality of RPs 158 further perform a routing function in directing the data communications towards the proper Internet destinations.

Next, consider a data communication between a user 150 connected to one of the plurality of ISDN 2B+D connection lines 148 and the Internet 166. The data communication carried from the user 150 over the ISDN connection line 148 comprises a digital data communication, thus there is no need to rout the communication through the modem pool 176. Rather, the digital data communication is directly routed from the GS/TS 142 over the DL2 interface connections 160 to the first plurality of RPs 158(1), 158(2), . . . , 158(n).

In the first plurality of RPs 158, the protocol of the data communication is converted (e.g., de-framed) from the protocol required for transmission over the ISDN connection line 148 (e.g., PPP or SLIP) to the protocol required for transmission over the Ethernet link 164 (e.g., TCP/IP). The protocol converted data communication is then output to the Ethernet link 164.

The Ethernet link 164 functions to concentrate the data communication with other data communications (from other users 150, as well as users 146 and 172) received from the first plurality of RPs 158 and the NT-A 174. The data communication is then sent over the Internet 166 through the Internet access point edge router 168. The first plurality of RPs 158 further perform a routing function in directing the data communications towards the proper Internet destinations.

Next, consider a data communication between a user 172 connected to one of the plurality of ADSL connection lines 170 and the Internet 166. The data communication at issue may be carried over the ADSL connection line 170 along with a voice communication. The NT-A 174 separates the data components from the voice components of the combined communication. The data components are then rerouted to the Ethernet link 164 already in the proper protocol (e.g., TCP/IP).

The Ethernet link 164 functions to concentrate the data communication with other data communications (from other users 172, as well as users 146 and 150) received from the first plurality of RPs 58 and the NT-A 74. The data communication is then sent over the Internet 166 through the Internet access point edge router 168. The first plurality of RPs 158 further perform a routing function in directing the data communications towards the proper Internet destinations.

Reverse processes occur with respect to data communications received from the Internet 166 for GS/TS 142 transmission to the users 146, 150, and 172. Thus, the Ethernet link 164 functions to concentrate the data communications received from the Internet 166 and the second plurality of RPs 158'. Furthermore, the first plurality of RPs 158 function to extract the data communications from the Ethernet link 164 and switch (e.g., frame) from the protocol required for transmission over the Ethernet link 164 (e.g., TCP/IP) to the protocol required for transmission over the POTS connection line 144 and ISDN connection line 148 (e.g, PPP or SLIP). The first plurality of RPs 158 and GS/TS 142 further perform a routing function in sending the data communications extracted from the Ethernet link 164 over the proper ones of the POTS connection lines 144, ISDN connection lines 148, or ADSL connection lines 170.

Figure 2:
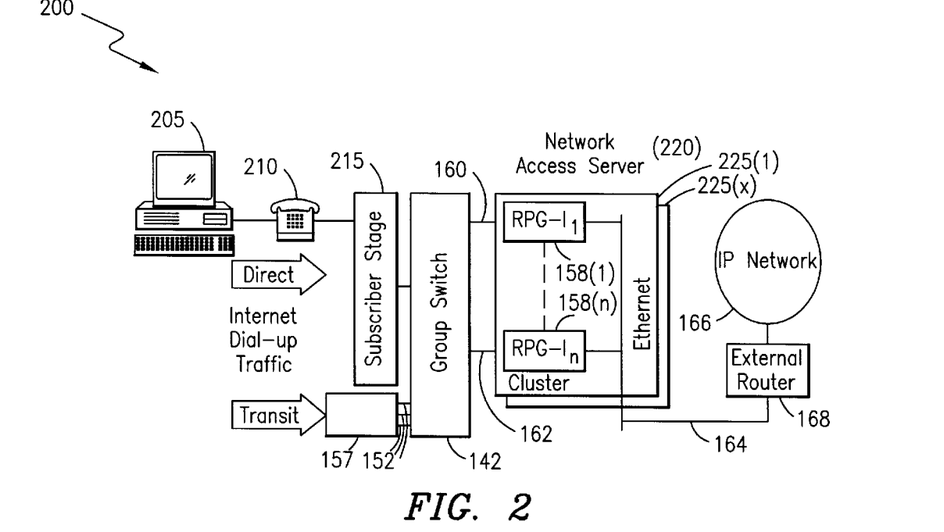
FIG. 2 illustrates a high-level diagram of a LE with an NAS which can be used to implement the present invention.

FIG. 2 illustrates a high-level diagram of a LE with an NAS which can be used to implement the present invention. A LE 200 provides a block-diagram view of the GS/TS 142, the NAS 220, and related communications equipment. A subscriber 205 (e.g., any of the users 146, 150, or 172 of FIG. 1) uses a terminal device 210 (e.g., a computer in conjunction with a modem or NT-I) to communicate over the subscriber stage 215 (e.g., connection lines 144, 148, or 170) directly with the GS/TS 142.

Also shown are transit communications over the PSTN/ISDN 157 over a plurality of E1/T1 trunk connections 152. It should be understood that incoming calls to the NAS 220 may arrive via the plurality of E1/T1 trunk connections 152. The NAS 220 is connected to the GS/TS 142 via DL2 interface connections 160 and 162. The NAS 220 is also connected to the Internet 166 (or some other private network such as a corporate intranet) via an external router 168 (e.g., an INET-POP, an edge router, or an Internet access point edge router) over an internal network. The NAS 220 also preferably performs authentication and accounting functions in connection with communications over the Internet 166.

This internal network of the NAS 220 can be governed by a variety of protocols and run at a myriad of speeds. The internal network is preferably, however, an Ethernet network 164. The Ethernet network 164 (or a plurality of Ethernet networks 164 linked by routers and/or gateways) interconnects clusters 225(1), . . . , 225(x). Each cluster 225 includes a plurality of RPG-Is (RPG-I$_1$ 158(1), . . . , RPG-I$_n$158(n)).

The RPs of the NAS 220 are shown and described as the special-purpose RPs termed RPG-Is (for Regional Processor unit with a Group switch). RPGs are especially suitable for protocol conversion. The "–I" designation reflects the application of the RPGs in the NAS 220 of FIG. 2. Specifically, the RPG-Is are on the "incoming" (e.g., call) side of the NAS 220. It should be understood that the present invention should not be considered as limited to RPG-Is because the present invention may be practiced with a myriad of processing units as known in the art.

The clusters (225(1), . . . , 225(x)) of devices (RPG-Is 158) that are connected by the local Ethernet 164 terminate the phone calls from subscribers 205 and interpret the link layer protocols from the terminal devices 210. In an alternative embodiment, instead of the external router 168, one of the RPG devices (e.g., an RPG-O (not specifically shown)) forwards the traffic to the Internet via, for example, a Frame Relay connection operated on top of 2 Mb/s links back to the PSTN. An RPG-Q is an RP that is especially suitable for protocol conversion and is installed on the "outgoing" (e.g., data network) side of the NAS 220 of FIG. 2. Using an RPG-O is particularly beneficial if the LE 200 does not have either an Ethernet or packet network. The Frame Relay connection provides access to the Internet over a semipermanent connection in the GS/TS 142. In any event, the internal Ethernet network 164 is a preferred implementation to achieve the desired functions of the NAS 220.

Each RPG-I 158 preferably has a set of 32 ports, although any number of ports can be within the spirit and scope of the invention. Each of the ports occupies one timeslot in the time-division multiplexed connection from the GS/TS 142, and each port is capable of handling one incoming call. It should be noted that a central processor (CP) (e.g., the SCP 154 of FIG. 1) supervises the behavior of the RPG-Is 158 in the NAS 220. The CP preferably includes call routing logic (e.g., software, hardware, firmware, etc.) that decides which RPG-I 158 will handle an incoming call. However, locating the call routing logic completely within the GS/TS 142, completely within the NAS 220, or distributed between the two, etc., are all embraced by the method and apparatus of the present invention.

As explained above, the subscriber 205 uses a terminal device 210 to communicate with the Internet 166 via, inter alia, the subscriber stage 215, the GS/TS 142, and the NAS 220. In order for the NAS 220 to be able to forward information from the terminal device 210 to the Internet 166, the NAS 220 and the terminal device 210 agree on a set of rules (e.g., a protocol) for communicating information. The information communication is expedited when transmission timing and data formatting are mutually predetermined.

An example of such a protocol is a PPP. The PPP can be used to set-up an IP communication from a client program of the subscriber 205 over a point-to-point link through the telecommunications system (e.g., subscriber stage 215 and GS/TS 142) to the NAS 220. The PPP aides in the determination of how each point will encapsulate data packets and which parameters will be used on the serial line. The use of the PPP enables the NAS 220 to support a myriad of different implementations for subscribers 205. In other words, the subscribers 205 may be using different operating systems and client programs, but the use of the PPP empowers the NAS 220 to interact with all of them.

Figure 3:
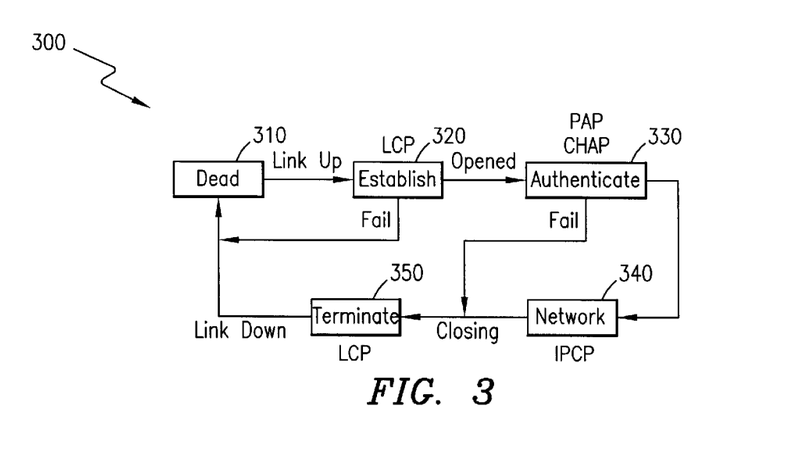
FIG. 3 illustrates a state diagram of various phases in a communication effectuated according to a PPP.

FIG. 3 illustrates a state diagram of various phases in a communication effectuated according to a PPP. The state diagram is shown generally at 300. It should be noted that the invention may be practiced with other computer communication protocols and that the PPP is exemplary only. The PPP involves several sub-protocols that determine the parameters for the connection. The management of the serial link parameters between the terminal device 210 and the NAS 220 is handled by the Link Control Protocol (LCP). The LCP is used to automatically configure link-related parameters such as encapsulation format options and to disconnect the link during the termination phase. Each end of the PPP link first sends LCP packets to configure and test the data link.

In state diagram 300, the link begins and ends with a dead phase 310. When an external event (e.g., an incoming call) indicates that the physical layer is ready to be used, the PPP will transition via a "Link Up" event to an establish phase 320. The LCP data packets are transmitted by each side of the link during the establish phase 320. The LCP is used to automatically configure link related parameters (e.g., encapsulation format options). Other configuration options can also be set in the establish phase 320. A failure to properly establish a link results in a "Fail" transition that leads to either a "Link Down" transition (also termed an "event") or directly back to the dead phase 310.

If a link is properly established, then an "Opened" transition leads to an authenticate phase 330. Authentication is preferably performed using either Password Authentication Protocol (PAP) or Challenge-Handshake Authentication Protocol (CHAP). Other authentication procedures, however, may be used. The authentication phase 330, while optional, is preferably instituted so that a given ISP can verify that one of its subscribing members (and not a non-member) is attempting to access the Internet through its ISP resources. If a failure occurs during the authenticate phase 330, then a "Fail" transition leads to either a "Closing" transition or directly to a terminate phase 350.

If authentication is successfully performed (or not performed at all), then the PPP procedure transitions to a network phase 340. In the network phase 340, various Network Control Protocols (NCPs) may be opened for communication under various protocols. One such NCP is the Internet Protocol Control Protocol (IPCP), which is used for setting-up and configuring parameters needed by the IP layer. Hence, the IPCP may be used by the NAS 220 for data packets destined for the Internet 166. If the set-up under the IPCP fails or when the IPCP session of the network phase 340 is concluded, a "Closing" transition occurs.

Whether the "Closing" transition in the state diagram 300 is reached from either the authenticate phase 330 (via a "Fail" transition) or the network phase 340, the terminate phase 350 follows the "Closing" transition. The terminate phase 350 operates through the LCP. Terminate packets are exchanged by the two ends of the link. Terminate-Request and Terminate-Ack packets may be transmitted. After the terminate phase 350, a "Link Down" transition occurs. The "Link Down" transition can signal the physical layer to disconnect to enforce the termination. From the "Link Down" transition, the state diagram 300 returns to the dead phase 310.

Figure 4A:
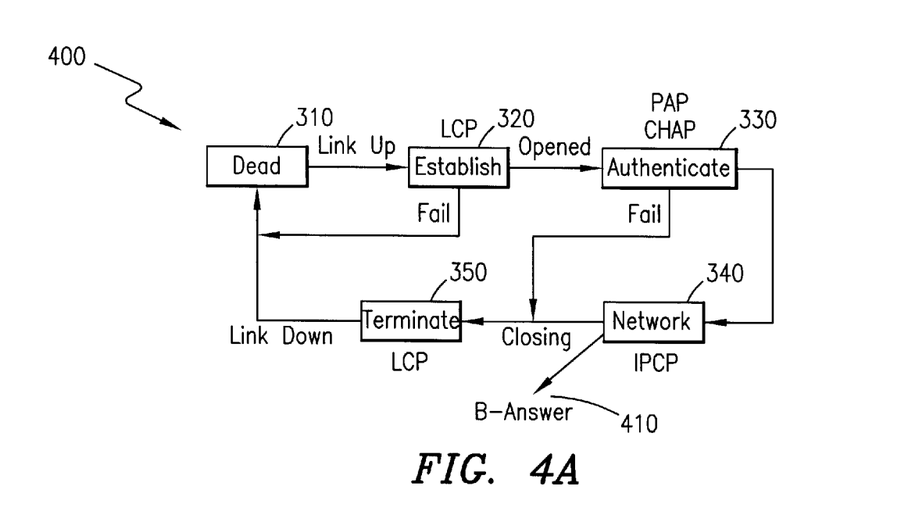
FIG. 4A illustrates a state diagram of various phases in a communication effectuated according to a PPP in accordance with a first aspect of the present invention.

Referring now to FIG. 4A, a state diagram of various phases in a communication effectuated according to a PPP in accordance with a first aspect of the present invention is illustrated. State diagram 400 includes a B-Answer communication 410 in proximity to the network phase 340. The B-Answer communication 410 represents a communication from the NAS 220 to the GS/TS 142. The GS/TS 142 may then activate (e.g., transmit) a telecommunications network B-Answer signal (e.g., a signal indicating that the called party has answered) to indicate to the telecommunications network (e.g, the PSTN) that the call connection procedure has been completed.

In a preferred embodiment, the B-Answer communication 410 is sent to the GS/TS 142 after the IPCP is properly configured. Advantageously, this first aspect of the present invention ensures that the telecommunications network does not record (e.g., log) the call connection procedure as being completed unless/until communication throughput to the Internet 166 can be provided to a dialing subscriber 205. Consequently, the subscriber 205 is not billed unless and until the service of access to the Internet 166 is actually provided.

Figure 4B:
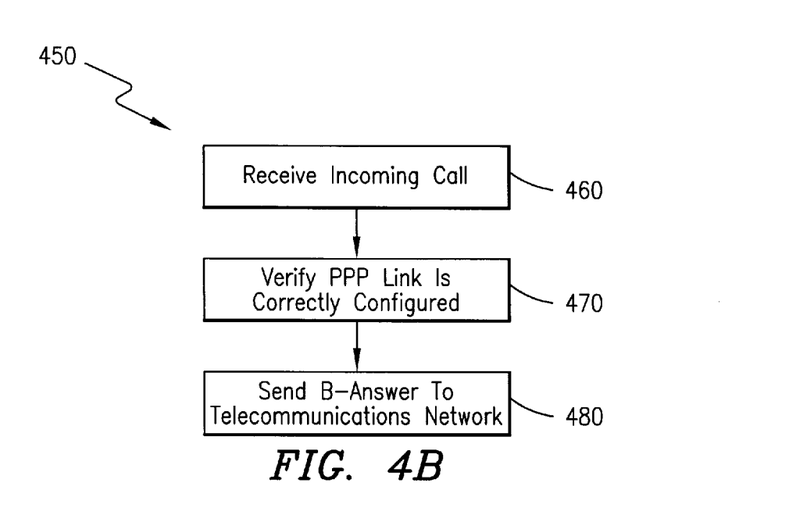
FIG. 4B illustrates a method in flowchart form for transmitting a B-Answer signal in accordance with the first aspect of the present invention.

Referring now to FIG. 4B, a method in flowchart form for transmitting a B-Answer signal in accordance with the first aspect of the present invention is illustrated. Flowchart 450 shows the primary steps of a method to ensure that a subscriber is not billed for services that are not provided. In step 460, the GS/TS 142 and then the NAS 220 receives an incoming call. The NAS 220 communicates with the network terminal 210 of the subscriber 205 to set-up a communication in accordance with a PPP. The NAS 220 verifies that the PPP link is correctly configured in step 470. The B-Answer communication 410 is thereafter sent to the GS/TS 142. The GS/TS 142 can then transmit a B-Answer signal in step 480 to the telecommunications network to signal call completion.

Figure 5A:
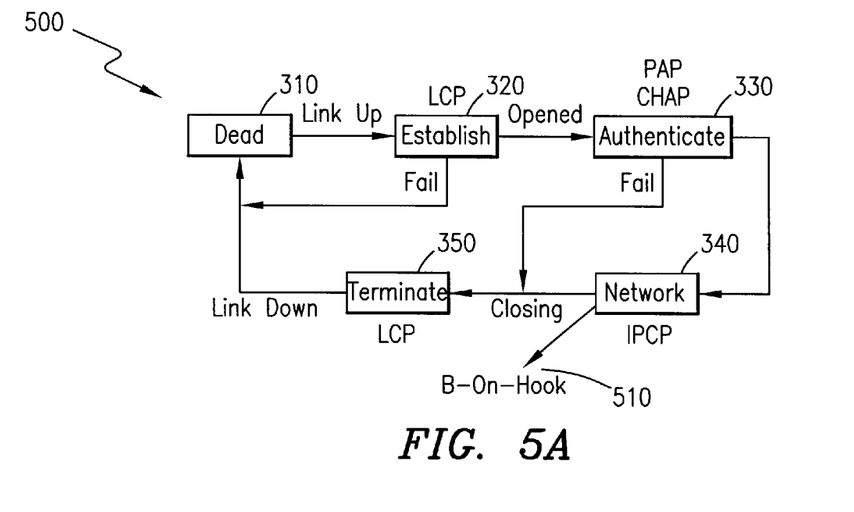
FIG. 5A illustrates a state diagram of various phases in a communication effectuated according to a PPP in accordance with a second aspect of the present invention.

Referring now to FIG. 5A, a state diagram of various phases in a communication effectuated according to a PPP in accordance with a second aspect of the present invention is illustrated. State diagram 500 includes a B-on-Hook communication 510 in proximity to the network phase 340. The B-on-Hook communication 510 represents a communication from the NAS 220 to the GS/TS 142. The GS/TS 142 may then activate (e.g., transmit) a telecommunications network B-on-Hook signal (e.g., a signal indicating that the called party has hung-up or otherwise ended the telecommunications connection) to indicate to the telecommunications network that the call connection is to be terminated.

In a preferred embodiment, the B-on-Hook communication 510 is sent to the GS/TS 142 either approximately simultaneously with or nearly immediately after either the cessation of the IPCP or the origination of terminate packets by the LCP. The B-on-Hook communication 510 may alternatively be generated, for example, as the PPP state is changing from the network phase 340 to the terminate phase 350 (e.g., during or as a result of the "Closing" transition). It should be understood, however, that the issuance of a B-on-Hook signal by the telecommunications network at any time prior to entering the dead phase 310 of the PPP state diagram 500 reduces the amount of telecommunications time that is billed when no Internet 166 access is being provided. Advantageously, this second aspect of the present invention ensures that the telecommunications network does not continue to charge a subscriber 205 after communication throughput to the Internet 166 is no longer being provided to the dialing subscriber 205. Consequently, the subscriber 205 is not billed for time in which the service of access to the Internet 166 is not actually being provided.

Figure 5B:
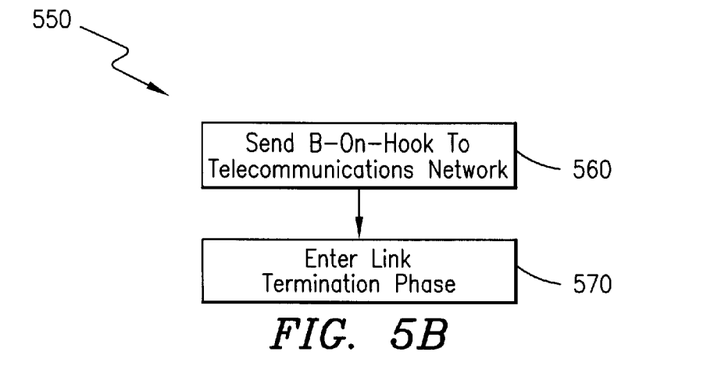
FIG. 5B illustrates a method in flowchart form for transmitting a B-on-Hook signal in accordance with the second aspect of the present invention.

Referring now to FIG. 5B, a method in flowchart form for transmitting a B-on-Hook signal in accordance with the second aspect of the present invention is illustrated. Flowchart 550 shows the primary steps of a method to ensure that a subscriber is not billed for services after such services are no longer being provided. In step 560, the B-on-Hook communication 510 is sent to the GS/TS 142. The GS/TS 142 also activates (e.g., transmits) a B-on-Hook signal in step 560 so that the telecommunications network signals the termination of the call. The link termination phase 350 of the PPP state diagram 500 is entered in step 570. As explained above during the description of FIG. 5A, the B-on-Hook communication 510 may also precede the "Closing" transition (e.g., a "Closing" event)

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for responding to a computer communication status with telecommunications signaling, comprising the steps of:

receiving an incoming call at a telecommunications switch, said incoming call originated by a calling subscriber;

routing said incoming call from said telecommunications switch to a network access server, said network access server providing information throughput to a private network;

determining that information throughput can be provided between said calling subscriber and said private network at said network access server; and transmitting a B-answer telecommunications network signal from said telecommunications switch to a related telecommunications system to activate a charging of said calling subscriber only after it is determined that information throughput can be provided in said step of determining.

2. The method of claim 1, further comprising the step of:

activating said charging of said calling subscriber responsive to reception of said B-answer telecommunications network signal.

3. The method of claim 1, wherein said step of determining that information throughput has been provided between said calling subscriber and said private network at said network access server comprises the step of determining that a point-to-point protocol link between said calling subscriber and said network access server is correctly configured; and said step of transmitting a B-answer telecommunications network signal comprises the step of transmitting a B-answer telecommunications network signal in response to a determination that said point-to-point protocol link between said calling subscriber and said network access server is correctly configured in said step of determining.

4. The method of claim 1, wherein said private network is the Internet.

5. A method for responding to a computer communication status with telecommunications signaling, comprising the steps of:
   receiving an incoming call at a telecommunications switch, said incoming call originated by a calling subscriber;
   routing said incoming call from said telecommunications switch to a network access server, said network access server providing information throughput to a private network;
   establishing that information throughput has been provided between said calling subscriber and said private network;
   determining that said provided information throughput is being terminated at said network access server; and
   transmitting a B-on-hook telecommunications network signal from said telecommunications switch to a related telecommunications system to deactivate a charging of said calling subscriber responsive to a determination that said provided information throughput is being terminated in said step of determining.

6. The method of claim 5, wherein
   said step of establishing that information throughput has been provided between said calling subscriber and said private network comprises the step of establishing a point-to-point protocol;
   said step of determining that said information throughput is being terminated at said network access server comprises the step of determining that at least one packet concluding a network phase of said point-to-point protocol is being transmitted between said calling subscriber and said network access server; and
   said step of transmitting a B-on-hook telecommunications network signal at said telecommunications switch comprises the step of transmitting a B-on-hook telecommunications network signal in response to transmission of said at least one packet concluding said network phase of said point-to-point protocol between said calling subscriber and said network access server.

7. The method of claim 5, wherein said private network is the Internet.

8. A method for relating telecommunications connections to private network communication throughput in a telecommunications switch and an associated network access server, comprising the steps of:
   receiving an incoming call at said telecommunications switch, said incoming call originating at a subscriber;
   routing said incoming call to said associated network access server;
   applying a point-to-point protocol to a link between said subscriber and said associated network access server;
   implementing a network phase according to said point-to-point protocol for said link; and
   sending a B-answer communication to said telecommunications switch from said associated network access server in response to said step of implementing a network phase.

9. The method of claim 8, further comprising the steps of, prior to said step of implementing a network phase according to said point-to-point protocol for said link:
   implementing an establish phase according to said point-to-point protocol for said link; and
   implementing an authenticate phase according to said point-to-point protocol for said link.

10. The method of claim 8, wherein said step of sending a B-answer communication to said telecommunications switch from said associated network access server in response to said step of implementing a network phase further comprises the step of sending said B-answer communication to said telecommunications switch from said associated network access server in response to negotiating an Internet protocol control protocol for said link in said network phase.

11. The method of claim 10, wherein said link provides Internet access to said subscriber via said associated network access server.

12. A method for relating telecommunications connections to private network communication throughput in a telecommunications switch and an associated network access server, comprising the steps of:
   receiving an incoming call at said telecommunications switch, said incoming call originating at a subscriber;
   routing said incoming call to said associated network access server;
   applying a point-to-point protocol to a link between said subscriber and said associated network access server;
   implementing a network phase according to said point-to-point protocol for said link;
   sending a B-answer communication to said telecommunications switch from said associated network access server in response to said step of implementing a network phase;
   transmitting a B-answer signal from said telecommunications switch to a related telecommunications system; and
   engaging a telecommunications connection for activating billing.

13. A method for relating telecommunications connections to private network communication throughput in a telecommunications switch and an associated network access server, comprising the steps of:
   providing information throughput between a subscriber and a private network;
   determining that said information throughput is to cease; and
   sending a B-on-hook communication from said associated network access server to said telecommunications switch prior to entering a dead phase of a point-to-point protocol of a link between said subscriber and said associated network access server, said step of sending a B-on-hook communication performed in response to said step of determining.

14. The method of claim 13, wherein said step of sending a B-on-hook communication from said associated network access server to said telecommunications switch prior to entering a dead phase of a point-to-point protocol comprises the step of sending said B-on-hook communication prior to entering a terminate phase.

15. The method of claim 13, wherein said step of sending a B-on-hook communication from said associated network access server to said telecommunications switch prior to entering a dead phase of a point-to-point protocol comprises the step of sending said B-on-hook communication prior to a closing event.

16. The method of claim 13, wherein said step of sending a B-on-hook communication from said associated network access server to said telecommunications switch prior to entering a dead phase of a point-to-point protocol comprises the step of sending said B-on-hook communication substantially simultaneously with transmission of terminate packets, said terminate packets corresponding to at least one of a link control protocol and an Internet protocol control protocol.

17. The method of claim 13, wherein said step of sending a B-on-hook communication from said associated network access server to said telecommunications switch prior to entering a dead phase of a point-to-point protocol comprises the step of sending said B-on-hook communication substantially simultaneously with a transition from a network phase to a terminate phase.

18. A method for relating telecommunications connections to private network communication throughput in a telecommunications switch and an associated network access server, comprising the steps of:

proviiding information throughput between a subscriber and a private network;

determining that said information throughput is to cease;

sending a B-on-hook communication from said associated network access server to said telecommunications switch prior to entering a dead phase of a point-to-point protocol of a link between said subscriber and said associated network access server;

transmitting a B-on-hook signal from said telecommunications switch to a related telecommunications system; and disengaging a telecommunications connection for deactivating billing.

19. An arrangement for responding to a computer communication status with telecommunications signaling, comprising:

means for receiving an incoming call at a telecommunications switch, said incoming call originated by a calling subscriber;

means for routing said incoming call from said telecommunications switch to a network access server, said network access server providing information throughput to a private network;

means for determining that information throughput can be provided between said calling subscriber and said private network at said network access server; and means for transmitting a B-answer telecommunications network signal from said telecommunications switch to a related telecommunications system to activate a charging of said calling subscriber only after it is determined that information throughput can be provided by said means for determining.

20. An arrangement for responding to a computer communication status with telecommunications signaling, comprising:

means for receiving an incoming call at a telecommunications switch, said incoming call originated by a calling subscriber;

means for routing said incoming call from said telecommunications switch to a network access server, said network access server providing information throughput to a private network;

means for establishing that information throughput has been provided between said calling subscriber and said private network;

means for determining that said provided information throughput is being terminated at said network access server; and means for transmitting a B-on-hook telecommunications network signal from said telecommunications switch to a related telecommunications system to deactivate a charging of said calling subscriber responsive to a determination that said provided information throughput is being terminated in said step of determining.

* * * * *